United States Patent
Hall

(10) Patent No.: US 8,352,707 B2
(45) Date of Patent: Jan. 8, 2013

(54) IMPLEMENTING ENHANCED HOST TO PHYSICAL STORAGE MAPPING USING NUMERICAL COMPOSITIONS FOR PERSISTENT MEDIA

(75) Inventor: David Robison Hall, Rochester, MN (US)

(73) Assignee: HGST Netherlands B.V., Amsterdam (NL)

( * ) Notice: Subject to any disclaimer, the term of this patent is extended or adjusted under 35 U.S.C. 154(b) by 330 days.

(21) Appl. No.: 12/797,683

(22) Filed: Jun. 10, 2010

(65) Prior Publication Data
US 2011/0307645 A1  Dec. 15, 2011

(51) Int. Cl.
*G06F 12/00* (2006.01)
(52) U.S. Cl. ........................................ 711/206
(58) Field of Classification Search .................. None
See application file for complete search history.

(56) References Cited

U.S. PATENT DOCUMENTS

| | | | |
|---|---|---|---|
| 7,925,925 B2 * | 4/2011 | Royer et al. | 714/22 |
| 7,944,375 B2 * | 5/2011 | Abali et al. | 341/51 |
| 8,019,925 B1 * | 9/2011 | Vogan et al. | 711/4 |
| 2009/0259805 A1 | 10/2009 | Kilzer et al. | |

OTHER PUBLICATIONS

Yang Jan-Ti, "Performance Comparison of Logical-Address-to-Physical-Address Algorithms for Non-Volatile Memory", pp. 482-485, 2003, IEEE.
"Composition (number theory)", http://en.wikipedia.org/wiki/Composition_(number_theory), 3 pages.
Jeff Chung, "SSD Application and Tech Trends", 980319DTF03.pdf, 44 pages, Mar. 19, 2009.

\* cited by examiner

*Primary Examiner* — Hiep Nguyen
(74) *Attorney, Agent, or Firm* — Joan Pennington

(57) ABSTRACT

A method and a storage system are provided for implementing host logical address to physical memory address mapping for persistent storage media including flash memory. Numerical compositions at multiple levels of granularity are used to store the logical address to physical memory address mappings. A plurality of groupings, each grouping including a fixed number of blocks is encoded using recursive composition, eliminating the need to store separate lengths.

20 Claims, 8 Drawing Sheets

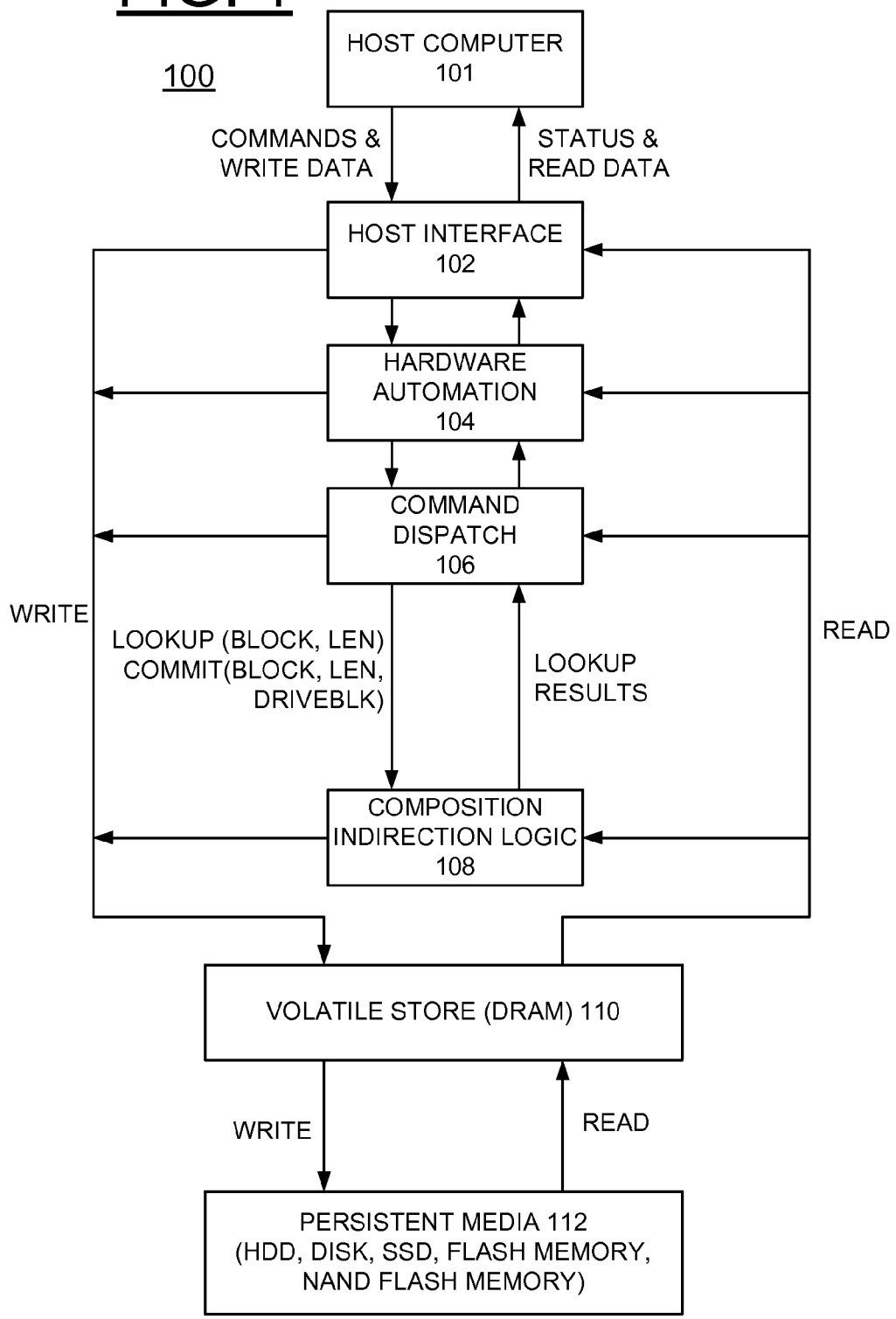

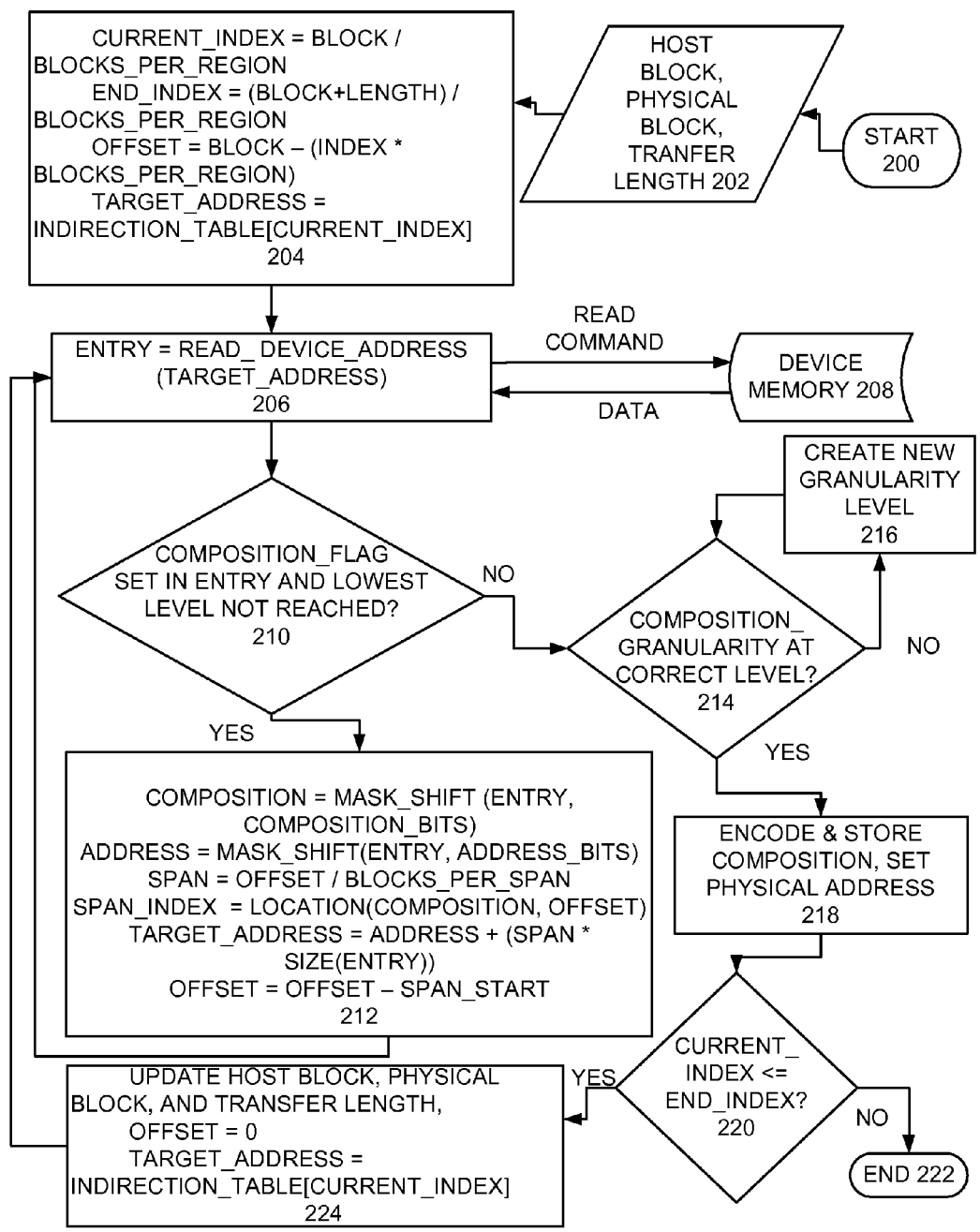

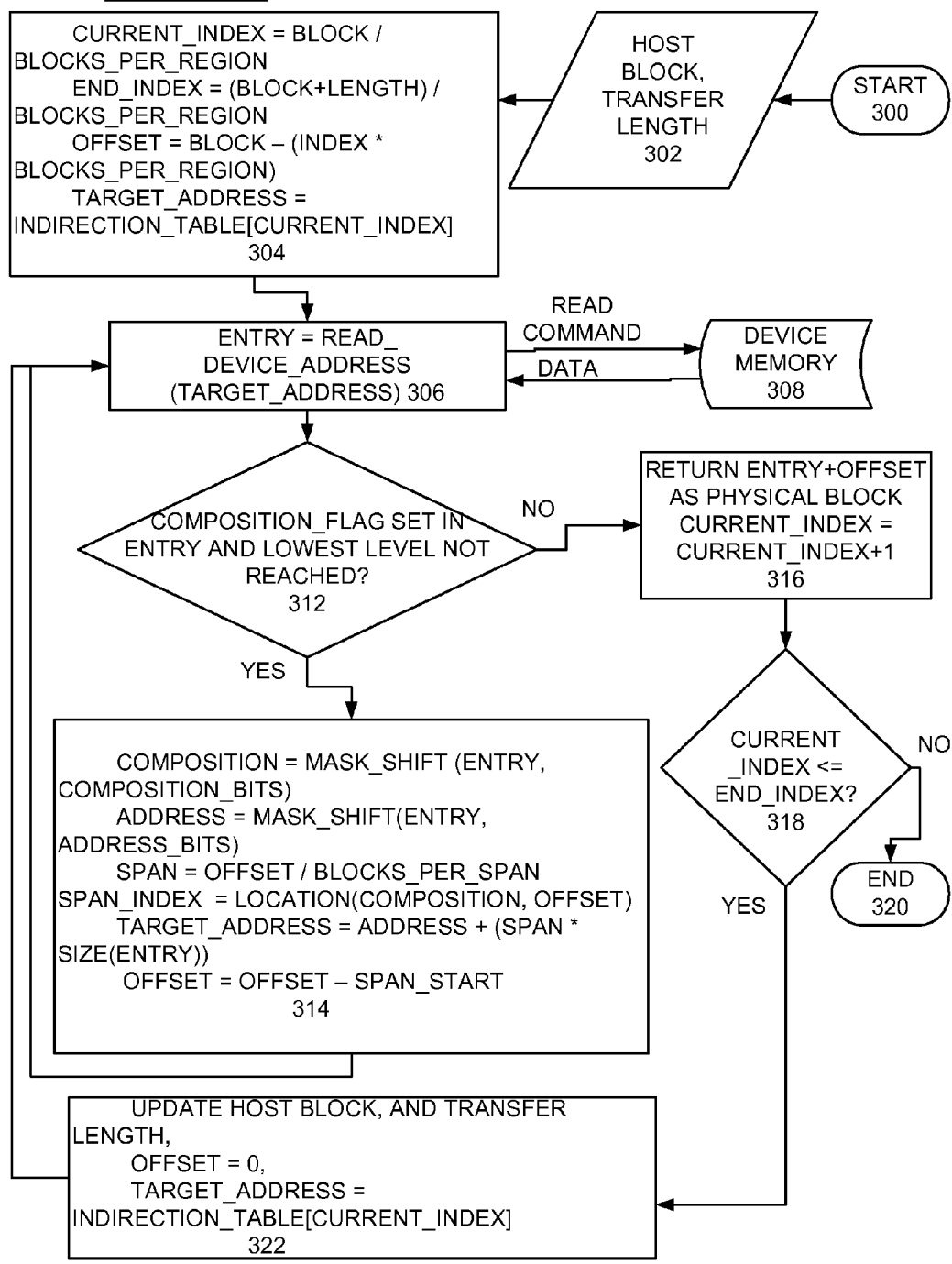

FIG. 4A
EXAMPLE ADDRESS DECODING
400
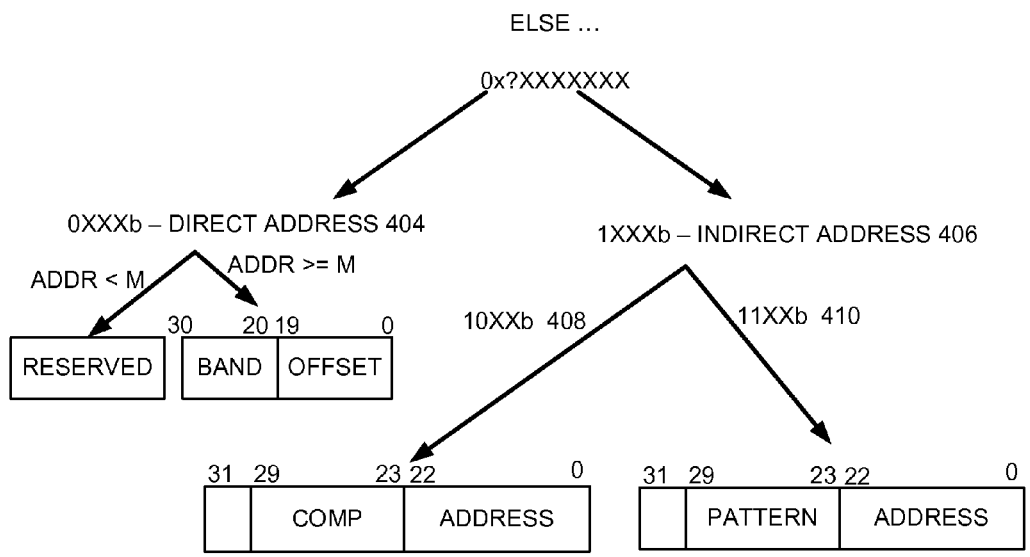
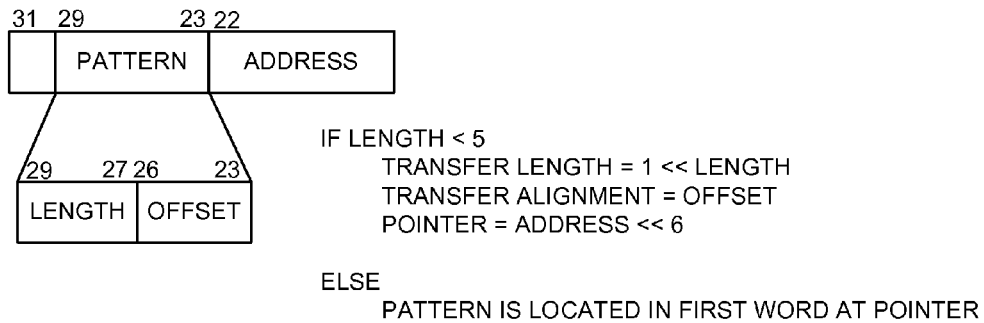
IF LENGTH < 5
    TRANSFER LENGTH = 1 << LENGTH
    TRANSFER ALIGNMENT = OFFSET
    POINTER = ADDRESS << 6
ELSE
    PATTERN IS LOCATED IN FIRST WORD AT POINTER

FIG. 4C

EXAMPLE INDEXING 430

EXAMPLE:
LBA = 6280, TRANSFER LENGTH = 12
INDEX = LBA << 11 = 3
SPAN_OFFSET = LBA – (INDEX >> 11) = 840

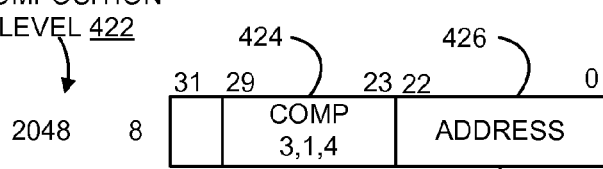

COMPOSITION LEVEL 422
424
426
31  29   23 22   0
2048   8   COMP 3,1,4   ADDRESS

2048 BLOCK SPAN SPLIT INTO 3 SUB-SPANS
768, 256, 1024
(256x3, 256x1, 256x4)

SPAN_OFFSET 434
(SPAN_OFFSET = 840 IN SECOND SUB-SPAN, SO SECOND ADDRESS IS DECODED)

↓

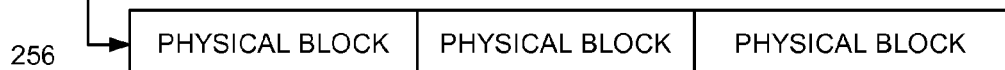

256 → | PHYSICAL BLOCK | PHYSICAL BLOCK | PHYSICAL BLOCK |

↓

DEVICE ADDRESS 436
(SECOND ADDRESS DECODES TO A DEVICE 112 ADDRESS, LBA FOUND AT THIS ADDRESS, OFFSET BY THE REMAINER OF (SPAN_OFFSET – PRECEEDING_SPANS OR 840-678 = 72)

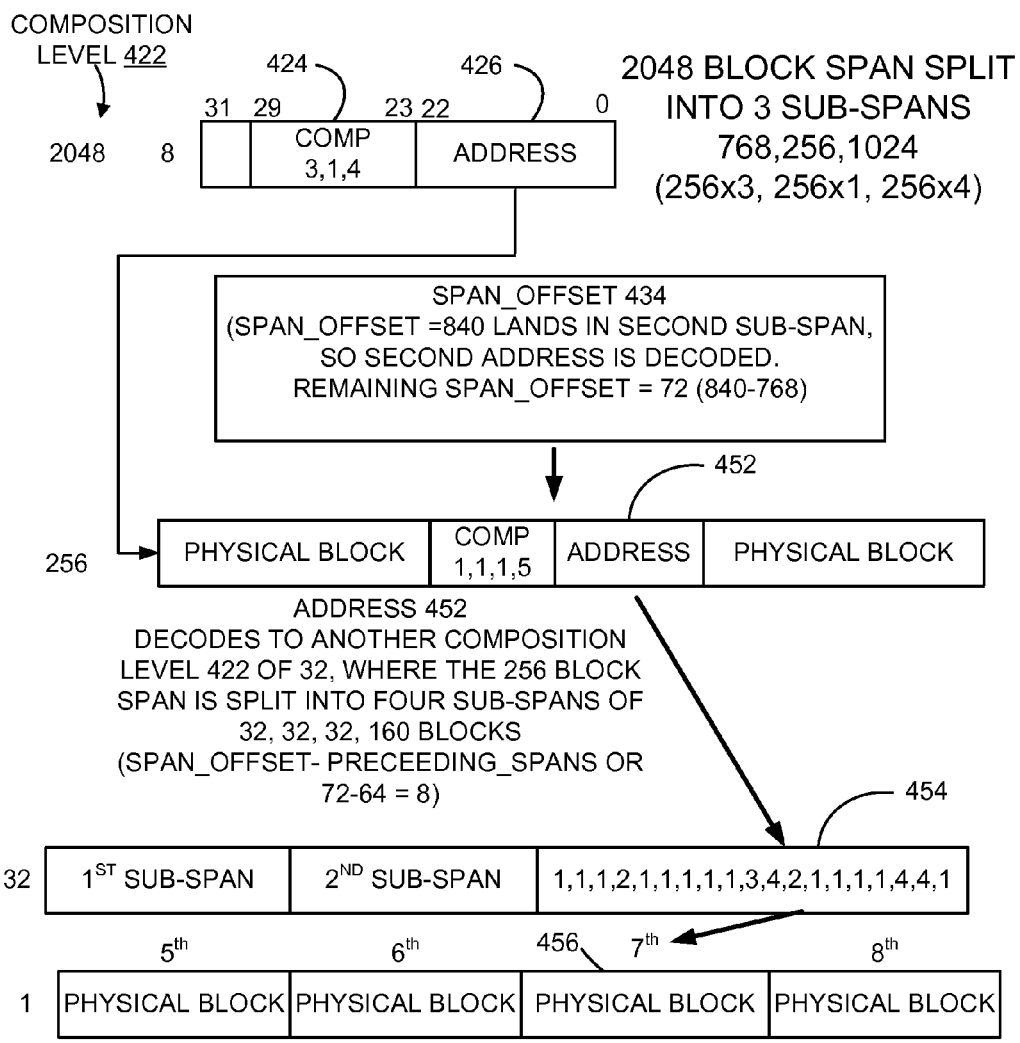

IMPLEMENTING ENHANCED HOST TO PHYSICAL STORAGE MAPPING USING NUMERICAL COMPOSITIONS FOR PERSISTENT MEDIA

FIELD OF THE INVENTION

The present invention relates generally to the data storage field, and more particularly, relates to a method and apparatus for implementing data storage mapping with composition indirection logic for persistent media including solid state drives, such as a flash memory chip array.

DESCRIPTION OF THE RELATED ART

Mass storage systems must map host logical block addresses (LBAs) to physical locations on the media.

For hard disk drives (HDD), this mapping is generally performed linearly. With the exception of defective locations, mapping a host LBA is a series of simple mathematical operations. With the exception of grown defective sites, LBAs do not move in the HDD system once the initial layout has been established.

In other storage devices, such as a Solid State Drive (SSD), the LBAs do not have fixed locations. This requires that the device keep a database of host to physical mappings. One method in use is to set aside enough memory for each LBA to describe the physical location (typically 4 bytes). The system then does a linear look-up to find the physical location. A significant drawback of this approach is the large memory requirements. For example, to map a 400 GB device with 512 bytes sectors requires 185 MB of memory. Multiple sector commands also require table lookups for each sector, increasing overhead and decreasing performance.

Another solution to this problem is to increase the sector size stored in the table. In one example 512 byte/sector system, the table could store only 8 k sectors. This reduces the memory requirements by eight. The drawback is that non-8 k transfers require a read-merge-write into the physical space, reducing performance and in the case of SSD, reducing the device's endurance.

A need exists for an effective and efficient mechanism to represent the host to physical mapping as compactly as possible while providing fast look-ups and updates.

SUMMARY OF THE INVENTION

Aspects of the present invention are to provide a method and a storage system are provided for implementing host to physical mapping for persistent media including solid state drives. Other important aspects of the present invention are to provide such method and storage system substantially without negative effect and that overcome some of the disadvantages of prior art arrangements.

In brief, a method and a storage system are provided for implementing host logical address to physical memory address mapping for persistent storage media including flash memory. Numerical compositions at multiple levels of granularity are used to store the host logical address to physical memory address mappings. A plurality of groupings of a fixed number of blocks is encoded using recursive composition.

BRIEF DESCRIPTION OF THE DRAWINGS

The present invention together with the above and other objects and advantages may best be understood from the following detailed description of the embodiments of the invention illustrated in the drawings, wherein:

FIG. 1 is a block diagram representation of a storage system for implementing data storage mapping in accordance with an embodiment of the invention;

FIGS. 2, and 3 are flow charts illustrating example operations of the system of FIG. 1 in accordance with embodiments of the invention;

FIGS. 4A, 4B, 4C and 4D are diagrams illustrating example address decoding, compositions and indexing used by the system of FIG. 1 in accordance with embodiments of the invention.

DETAILED DESCRIPTION OF THE EMBODIMENTS

Figure 4B:
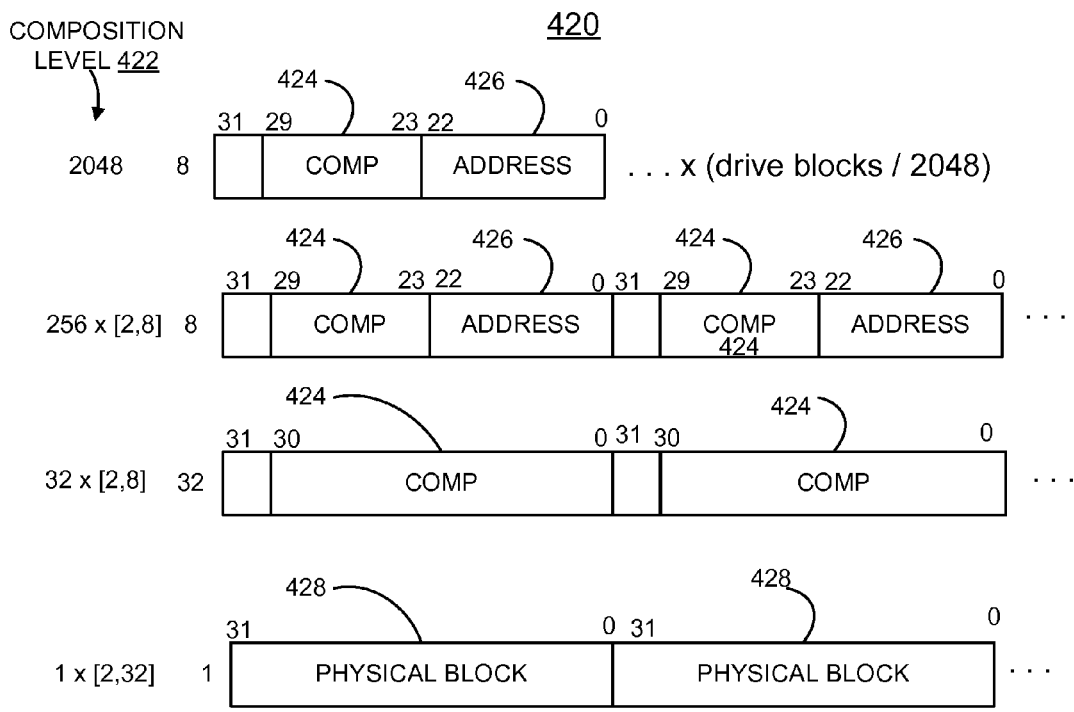

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the embodiments of the invention, methods and a storage system are provided for efficiently representing host to physical address mapping that is compact and provides fast look-ups and updates. The system uses numerical compositions at multiple selected granularities to store the host to physical address mappings. The methods and system uses recursive composition to encode every possible grouping of a fixed number of blocks, eliminating the need to store separate lengths. At any given level of the numerical compositions, a grouping may represent a fixed number of blocks of the persistent media or may refer to another level of further numerical composition at a lower level.

Having reference now to the drawings, in FIG. 1, there is shown an example system generally designated by the reference character 100 for implementing host to physical address mapping in accordance with an embodiment of the invention. System 100 includes a host computer 101 coupled to a host interface 102. The host interface 102 receives commands and data to be written from the host computer 101 and sends status and read data to the host computer 101.

System 100 performs read and write operations as indicated at a respective line representing functional operations labeled READ, WRITE coupled to the host interface 102, a hardware automation block 104, a command dispatch block 106 and composition indirection logic 108 in accordance with an embodiment of the invention, and a volatile store 110, such as a dynamic random access memory (DRAM) 110. The command dispatch block 106 provides Lookup (block, length) and Commit (block, length, DriveBlk) inputs to the composition indirection logic 108 and receives Lookup Results from the composition indirection logic 108 as indicated at a respective line representing functional operations labeled LOOKUP (BLOCK, LEN) COMMIT (BLOCK, LEN, DRIVEBLK), and LOOKUP RESULTS.

System 100 includes a persistent media or a storage device 112, such as a disk, hard disk drive (HDD), solid state drive (SSD), a flash memory, NAND flash memory array, or other persistent storage device 112, providing read data and receiving write data from the volatile store 110 or DRAM 110. The composition indirection logic 108 is stored on persistent media, such as in a reserved area of the persistent media 112.

In accordance with features of the embodiments of the invention, the system uses numerical compositions providing multiple selected granularities to store the host to physical mappings, for example, as illustrated in FIGS. 2, 3, 4A, 4B, 4C and 4D.

A composition of a positive integer N is a way of writing N as a sum of strictly positive integers. Two sums which differ in the order of their summands are deemed to be different compositions, while they would be considered to be the same partition. A composition where some of the summands are allowed to be zero is sometimes referred to as a weak composition. Conventionally the empty composition is counted as the sole composition of 0, and there are no compositions of negative integers. There are $2^{N-1}$ compositions of the positive integer N, or N≧1.

In accordance with features of the embodiments of the invention, recursive composition is used to encode multiple possible grouping of a fixed number of blocks, eliminating the need to store separate lengths. For example, with N=8, could be grouped as [8], [7,1], [1,7], [3,2,3], [4,4], [1,1,1,1, 1,1,1,1], and the like.

Referring to FIG. 2, there are shown example composition indirection update operations of the system 100 of FIG. 1 in accordance with embodiments of the invention starting at a block 200. An input of a host block, physical block, and transfer length is received as indicated at a block 202, where the host block represents a host block address or logical block address, and the physical block represents a physical block address of persistent media 112.

As indicated at a block 204, values identified include
Current_Index=Block/Blocks_Per_Region,
End_Index=(Block+Length)/Blocks_Per_Region,
Offset=Block−(Index*Blocks_Per_Region),
Target_Address=Indirection_Table[Current_Index).

Next the entry is set as indicated at a block 206, where ENTRY=READ_DEVICE_ADDRESS (TARGET ADDRESS). A device memory 208 receives a READ COMMAND and DATA is returned for the entry at block 206, for the identified Read_Device_Address (Target Address).

As indicated at a decision block 210, checking whether the Composition_Flag is set in Entry and lowest level not reached is performed. If the Composition_Flag is set in Entry and lowest level not reached, then as indicated at a block 212 values identified include
Composition=Mask_Shift(Entry, Composition_Bits),
Address=Mask_Shift(Entry, Address_Bits),
Span=Offset/Blocks_Per_Span;
Span_Index=Location (Composition, Offset),
Target_Address=Address+Span*Size(Entry)),
Offset=Offset−Span_Start.

Then the operations return to block 206 for the entry and checking whether the Composition_Flag is set in Entry and lowest level not reached is performed at decision block 210. When the Composition_Flag is not set in Entry or the lowest level reached, then checking whether the Composition_Granularity is at the correct level as indicated at a decision block 214. If the Composition_Granularity is not at the correct level, then a new granularity level is created as indicated at a block 216. When the Composition_Granularity is at the correct level, then the composition is encoded and stored, and the physical address is set as indicated at a block 218. Checking whether the Current_Index is less than or equal to the End_Index is performed as indicated at a decision block 220. If the Current_Index is not less than or equal to the End_Index, then the operations end as indicated at a block 222. Otherwise the host block, physical block and transfer length are updated, and values are set including the Offset=0, and Target_Address=Indirection_Table[Current_Index] as indicated at a block 224. Then the operations return to block 206 for the entry where ENTRY=READ_DEVICE_ADDRESS (TARGET ADDRESS).

Referring to FIG. 3, there are shown example composition indirection lookup operations of the system 100 of FIG. 1 in accordance with embodiments of the invention starting at a block 300. An input block, length is received as indicated at a block 302.

As indicated at a block 304, values identified include
Current_Index=Block/Blocks_Per_Region,
End_Index=(Block+Length)/Blocks_Per_Region,
Offset=Block−(Index*Blocks_Per_Region),
Target_Address=Indirection_Table[Current_Index).

Next the entry is set as indicated at a block 306, where ENTRY=READ_DEVICE_ADDRESS (TARGET ADDRESS). A device memory 308 receives a READ COMMAND and DATA is returned for the entry at block 306, for the identified Read_Device_Address (Target Address).

As indicated at a decision block 312, checking whether the Composition_Flag is set in Entry and lowest level not reached is performed. If the Composition_Flag is set in Entry and lowest level not reached, then as indicated at a block 314 values identified include
Composition=Mask_Shift(Entry, Composition_Bits),
Address=Mask_Shift(Entry, Address_Bits),
Span=Offset/Blocks_Per_Span;
Span_Index=Location(Composition, Offset),
Target_Address=Address+Span*Size(Entry)),
Offset=Offset−Span_Start.

Then the operations return to block 306 for the entry and checking whether the Composition_Flag is set in Entry and lowest level not reached is performed at decision block 312. When the Composition_Flag is not set in Entry or the lowest level reached, then Entry+Offset is returned as the Physical Location with Current_Index=Current_Index+1 as indicated at a block 316.

Checking whether the Current_Index is less than or equal to the End_Index is performed as indicated at a decision block 318. If the Current_Index is not less than or equal to the End_Index, then the operations end as indicated at a block 320. Otherwise when the Current_Index is less than or equal to the End_Index, then the host block, and transfer length are updated, and values are values are set including the Offset=0, and Target_Address=Indirection_Table[Current_Index] as indicated at a block 322. Then the operations return to block 306 for the entry where ENTRY=READ_ DEVICE_ADDRESS (TARGET ADDRESS).

Referring to FIG. 4A, there are shown example address decoding generally designated by the reference character 400, such as used by the system 100 in accordance with embodiments of the invention. Example address decoding 400 includes an example 0x00000000 LBA 420 not present in table, else 0x?XXXXXXX provides 0XXXb—direct address 404 and 1XXXb—Indirect Address 406. The 0XXXb—direct address 404 addresses Band and Offset with Addr>=M and Reserved with Addr<M.

The 1XXXb—indirect address 406 addresses Composition and Address indicated at line labeled 10XXb 408 and Pattern and Address indicated at line labeled 11XXb 410. Then, for example, to implement Fixed Transfer lengths 412:
If Length<5
  Transfer length=1<<Length
  Transfer alignment=Offset
  Pointer=Address<<6

Else
   Pattern is located in first word at pointer.

Referring to FIG. 4B, there are shown example composition indirection for mixed transfer lengths generally designated by the reference character 420, such as used by the system 100 in accordance with embodiments of the invention. The system 100 uses numerical compositions at multiple granularities to store the host to physical mappings. As shown, the example 8-8-32 composition 420 includes a plurality of composition levels 422 including 2048, 256×[2,8], 32×[2,8], and 1×[2,32]. The composition levels 422 of 2048 and 256×[2,8] include a composition 424 and address 426. Each composition 424 requires N−1 bits for a fixed block size of N, or 7 bits for the fixed block size of 8, with the address of 23 bits 0:22 for the composition levels 422 of 2048 and 256×[2,8], as shown. The composition 424 for the composition level 422 of 32×[2,8] requires N−1 bits or 31 bits for the fixed block size of N=32. The composition level 422 of 1×[2, 32] includes Physical Block 428 of 32 bits for the persistent media 112.

Referring to FIG. 4C, there are shown indexing generally designated by the reference character 430 for the example 8-8-32 composition 420, such as used by the system 100 in accordance with embodiments of the invention. The illustrated indexing example 430 includes an LBA=6280, transfer length=12, INDEX=LBA<<11=3, SPAN_OFFSET=LBA−(INDEX>>11)=840. The composition level 422 of 2048 block is split into three sub-spans of 768, 256, 1024 block each or (256×3, 256×1, 256×4) as indicted by COMP 424 of 3,1,4. The address points to the compositions for the 256-block level. The SPAN_OFFSET 434=LBA−(INDEX>>11)=840 lands in the second sub-span, so the second address is decoded and this address decodes to the device address 436. The LBA can be found at this address 436, offset by the remainder of (SPAN_OFFSET−PRECEEDING_SPANS), which in this case is (840−768)=72.

Referring to FIG. 4D, there are shown indexing generally designated by the reference character 450 for the example 8-8-32 composition 420, such as used by the system 100 in accordance with embodiments of the invention. The illustrated indexing example 450 includes an LBA=6280, transfer length=12, INDEX=LBA<<11=3, SPAN_OFFSET=LBA−(INDEX>>11)=840. The composition level 422 of 2048 block is split into three sub-spans of 768, 256, 1024 block each or (256×3, 256×1, 256×4) as indicted by COMP 412 of 3,1,4. The address points to the compositions for the 256-block level. The SPAN_OFFSET 434=LBA−(INDEX>>11)=840 lands in the second sub-span. For example 450, the remaining SPAN_OFFSET=72 (840−768), lands in the second sub-span, and the second address 434 is decoded and this address decodes to a third span composition block 452, where the 256 composition block span is split into four sub-spans of 32, 32, 32, 160 block each (32×1, 32×1, 32×1, 32×5), the remaining Span_Offset of (SPAN_OFFSET−PRECEEDING_SPANS), which in this case is (72−64)=8. This third sub-span composition block 454 is broken into 1,1,1,2,1, 1,1,1,1,3,4,2,1,1,1,1,4,4,1 and the composition indicates LBA=6280, Length=12 is broken into 6 locations of persistent memory 112, such as 6 NAND locations, starting at the 7th position 456 of this sub-span.

Memory usage for the indexing example 430 is 20 deltas at the 1-block level. Memory efficiency increases as the number of deltas increases, for example, instead of 2 bytes/delta for length, it is 4 bytes/num_deltas (2-32), which approaches 1-bit/delta. For the composition level 422 of 2048, 1×4 bytes/ 12 (shared by 3, then 4 compositions)=0.33 bytes. For the composition level 422 of 256, 1×4 bytes/4 (shared 4 compositions)=1 bytes. For the composition level 422 of 32, 1×4 bytes=4 bytes. For the composition level 422 of 1, 20×4 bytes=80 bytes. In sum, (0.33+1+4+80)/20 deltas=4.26 bytes/delta.

Figure 5:
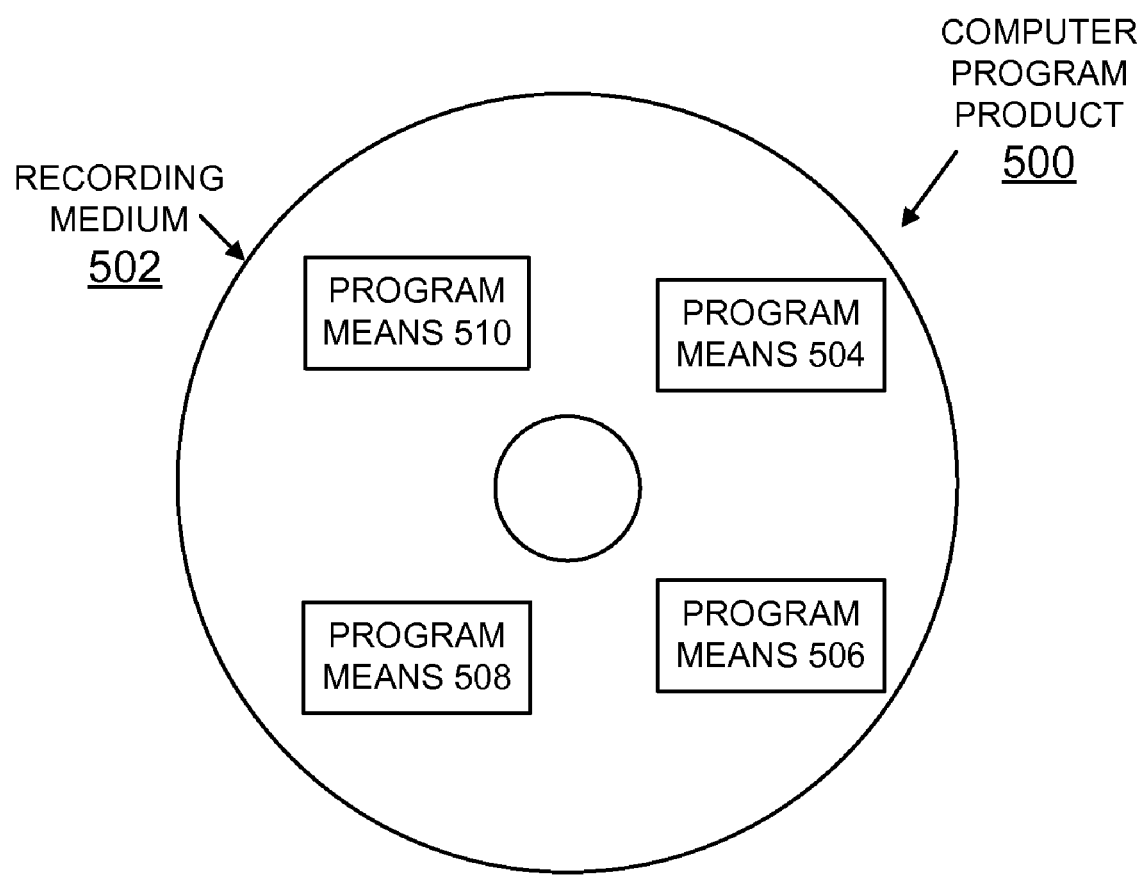
FIG. 5 is a block diagram illustrating a computer program product in accordance with embodiments of the invention.

Referring now to FIG. 5, an article of manufacture or a computer program product 500 of the invention is illustrated. The computer program product 500 includes a computer readable recording medium 502, such as, a floppy disk, a high capacity read only memory in the form of an optically read compact disk or CD-ROM, a tape, or another similar computer program product. Computer readable recording medium 502 stores program means or control code 504, 506, 508, 510 on the medium 502 for carrying out the methods for implementing host to physical address mapping of the embodiments of the invention in the system 100 of FIG. 1.

A sequence of program instructions or a logical assembly of one or more interrelated modules defined by the recorded program means or control code 504, 506, 508, 510, direct the system 100 for implementing host to physical address mapping of the embodiments of the invention.

While the present invention has been described with reference to the details of the embodiments of the invention shown in the drawing, these details are not intended to limit the scope of the invention as claimed in the appended claims.

What is claimed is:

1. A method for implementing host logical address to physical memory address mapping for persistent storage media comprising:
   using numerical compositions at multiple levels of granularity to store host logical address to physical memory address mappings; said numerical compositions of a positive integer N where N≧1 including $2^{N-1}$ compositions of the positive integer N, and writing the positive integer N as a sum of strictly positive integers; and
   using recursive composition to encode a plurality of groupings of a fixed number of blocks, eliminating a need to store separate lengths for address mapping.

2. The method as recited in claim 1 wherein the persistent storage media includes a flash memory.

3. The method as recited in claim 1 wherein using numerical compositions at multiple levels of granularity to store host logical address to physical memory address mappings includes providing composition indirection logic for storing an indirection table, and providing lookup results and updates.

4. The method as recited in claim 1 wherein using numerical compositions at multiple levels of granularity to store host logical address to physical memory address mappings includes providing an indirection table with a current index to identify a target address for the persistent media.

5. The method as recited in claim 1 wherein using numerical compositions at multiple levels of granularity to store host logical address to physical memory address mappings includes creating a new granularity level for a composition, encoding, and storing said composition.

6. The method as recited in claim 1 wherein using recursive composition to encode a plurality of groupings of a fixed number of blocks includes providing each composition together with an address, and decoding said address to another composition.

7. The method as recited in claim 1 wherein using numerical compositions at multiple levels of granularity to store host logical address to physical memory address mappings includes receiving an input block and transfer length, and identifying a current index.

8. The method as recited in claim 7 wherein identifying a current index includes providing said input block divided by a number of blocks per region.

9. The method as recited in claim 7 includes identifying an end index equal to a summation of said input block and said transfer length divided by a number of blocks per region.

10. The method as recited in claim 7 includes identifying an offset equal to said identified current index multiplied by a number of blocks per region subtracted from said input block.

11. The method as recited in claim 7 includes identifying a composition for a target address entry using a mask shift for said target address entry and composition bits.

12. The method as recited in claim 7 includes identifying an address for a target address entry using a mask shift for said target address entry and address bits.

13. The method as recited in claim 7 includes identifying an offset equal to said identified current index multiplied by a number of blocks per region subtracted from said input block, and identifying a span equal to said offset divided by a number of blocks per span.

14. The method as recited in claim 13 includes identifying a span index using a location for said composition and said offset, identifying an updated target address equal to a summations of said address and said span index multiplied by a size in said target address entry; and identifying an updated offset equal to a span start subtracted from said offset.

15. An apparatus for implementing logical address to physical memory address mapping for persistent storage media comprising;
    composition indirection logic storing an indirection table, and providing lookup results and updates;
    said composition indirection logic using numerical compositions at multiple levels of granularity to store host to physical mappings; said numerical compositions of a positive integer N where $N \geq 1$ including $2^{N-1}$ compositions of the positive integer N, and writing the positive integer N as a sum of strictly positive integers; and
    said composition indirection logic using recursive composition to encode a plurality of groupings, each grouping including a fixed number of blocks, eliminating a need to store separate lengths for address mapping.

16. The apparatus as recited in claim 15 wherein the persistent storage media includes a flash memory.

17. The apparatus as recited in claim 15 wherein said composition indirection logic receives an input block and transfer length, and identifies a current index, and provides said indirection table with a current index to identify a target address for the persistent storage media.

18. A data storage system comprising:
    a persistent storage media;
    composition indirection logic for implementing host logical address to physical memory address mapping for said persistent storage media, said composition indirection logic storing an indirection table, and providing lookup results and updates;
    said composition indirection logic using numerical compositions at multiple levels of granularity to store host logical address to physical memory address mappings; said numerical compositions of a positive integer N where $N \geq 1$ including $2^{N-1}$ compositions of the positive integer N, and writing the positive integer N as a sum of strictly positive integers; and
    said composition indirection logic using recursive composition to encode a plurality of groupings, each grouping including a fixed number of blocks, eliminating a need to store separate lengths for address mapping.

19. The data storage system as recited in claim 18 wherein said composition indirection logic receives an input block and transfer length, and identifies a current index, and provides said indirection table with a current index to identify a target address for the persistent storage media.

20. The data storage system as recited in claim 19 wherein said composition indirection logic creates a new granularity level for said composition, encodes, and stores said composition.

\* \* \* \* \*